(12) United States Patent
Yang et al.

(10) Patent No.: US 11,064,662 B2
(45) Date of Patent: Jul. 20, 2021

(54) BLOWER

(71) Applicant: Nanjing Chervon Industry Co., Ltd., Nanjing (CN)

(72) Inventors: Dezhong Yang, Nanjing (CN); Jifeng Feng, Nanjing (CN); Jianpeng Guo, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 399 days.

(21) Appl. No.: 16/130,523

(22) Filed: Sep. 13, 2018

(65) Prior Publication Data

US 2019/0098844 A1 Apr. 4, 2019

(30) Foreign Application Priority Data

Sep. 29, 2017 (CN) .......................... 201710902849.1

(51) Int. Cl.
*A01G 20/47* (2018.01)

(52) U.S. Cl.
CPC .................... *A01G 20/47* (2018.02)

(58) Field of Classification Search
CPC .............................. A01G 20/47; E01H 1/0863
See application file for complete search history.

(56) References Cited

U.S. PATENT DOCUMENTS

2006/0185114 A1\* 8/2006 Joos .......................... A47L 5/14
15/330

\* cited by examiner

*Primary Examiner* — David Redding
(74) *Attorney, Agent, or Firm* — Greenberg Traurig, LLP

(57) ABSTRACT

A blower has a fan, a motor, an air duct assembly having an air duct passage with an air inlet and an air outlet where the fan rotates to drive the airflow to enter into the air duct passage from the air inlet and to be exposed out of the air outlet, and an electrostatic neutralization apparatus. The electrostatic neutralization apparatus includes a first conductive end and a second conductive end wherein the first conductive end is located within the air duct passage and close to the fan and the second conductive end is also located within the air duct passage. The electrostatic neutralization apparatus of the blower effectively neutralizes electrostatic charges generated by the fan.

13 Claims, 10 Drawing Sheets

BLOWER

RELATED APPLICATION INFORMATION

This application claims the benefit under 35 U.S.C. § 119(a) of Chinese Patent Application No. CN201710902849.1, filed on Sep. 29, 2017, the disclosure of which is incorporated herein by reference in its entirety.

BACKGROUND

A blower is a common garden tool that can help a user to clean up fallen leaves in a garden by airflows generated by the blower. Existing blowers may be generally classified into centrifugal blowers and axial flow blowers. When a fan is driven to rotate in the blower, friction between the fan and air due to continuous rotation of the fan will lead to or generate electrostatic charges. If the generated electrostatic charges cannot be discharged in time, a large amount of electrostatic charges are accumulated and an electrical motor or another electronic component may be greatly damaged.

SUMMARY

To eliminate disadvantages of the prior art, the following describes a blower that is adapted to discharge electrostatic charges in a timely manner.

For this purpose, one example of a blower has a fan, a motor for driving the fan to rotate, an air duct assembly having an air duct passage with an air inlet and an air outlet, wherein the fan is located within the air duct passage of the air duct assembly and close to the air inlet and the fan rotates to drive an airflow to enter, along an airflow direction, into the air duct passage from the air inlet and to be exported out of the air outlet, and an electrostatic neutralization apparatus, mounted onto the blower, where the electrostatic neutralization apparatus has a first conductive end, a second conductive end, and a connection portion connected between the first conductive end and the second conductive end. The connection portion is attached to a wall of the air duct assembly, the first conductive end is configured to penetrate through the wall of the air duct assembly so as to extend into the air duct passage, the first conductive end is located close to the fan, the second conductive end is configured to penetrate through the wall of the air duct assembly so as to extend into the air duct passage, and the second conductive end is located, along the airflow direction, much closer to the air outlet than the first conductive end.

Further, the first conductive end may be formed with one or more tips exposed to the air duct passage of the air duct assembly.

Further, the first conductive end may be configured to extend from the wall of the air duct assembly toward the fan.

Further, a distance between the first conductive end and the fan may be less than or equal to 15 mm.

Further, the second conductive end may be formed with one or more tips located within the air duct passage of the air duct assembly.

Further, the electrostatic neutralization apparatus may include a conductor where the conductor is fixed to the air duct assembly and has the first conductive end that extends into the air duct passage of the air duct assembly.

Further, the electrostatic neutralization apparatus may include a conductive wire where the conductive wire has the first conductive end that extends from the wall of the air duct assembly into the air duct passage of the air duct assembly.

Another example of a blower has a fan, a motor for driving the fan to rotate, an air duct assembly having an air duct passage with an air inlet and an air outlet, wherein the fan is located within the air duct passage of the air duct assembly and close to the air inlet and the fan rotates to drive an airflow to enter, along an airflow direction, into the air duct passage from the air inlet and to be exposed out of the air outlet, and an electrostatic neutralization apparatus attached to the blower. The electrostatic neutralization apparatus includes a conductor, the conductor has a first conductive end and a second conductive end arranged such that the first conductive end is disposed within the air duct passage of the air duct assembly and close to the fan, the second conductive end is disposed within the air duct passage of the air duct assembly, and the second conductive end is located much closer to the air outlet than the first conductive end.

Further, the first conductive end may be free and located in a suspended manner within the air duct passage of the air duct assembly.

Further, a distance between the first conductive end and the fan may be less than or equal to 15 mm.

Further, the second conductive end may be free and located in a suspended manner within the air duct passage of the air duct assembly.

Further, the second conductive end may be formed with one or more tips exposed to the air duct passage of the air duct assembly.

Further, the first conductive end may be formed with one or more tips exposed to the air duct passage of the air duct assembly.

Further, the first conductive end may be configured to extend from a wall of the air duct assembly toward the fan.

At least one advantage of the electrostatic neutralization apparatus described hereinafter is that the apparatus can effectively neutralize electrostatic charges generated during rotation of the fan.

DETAILED DESCRIPTION

Figure 1:
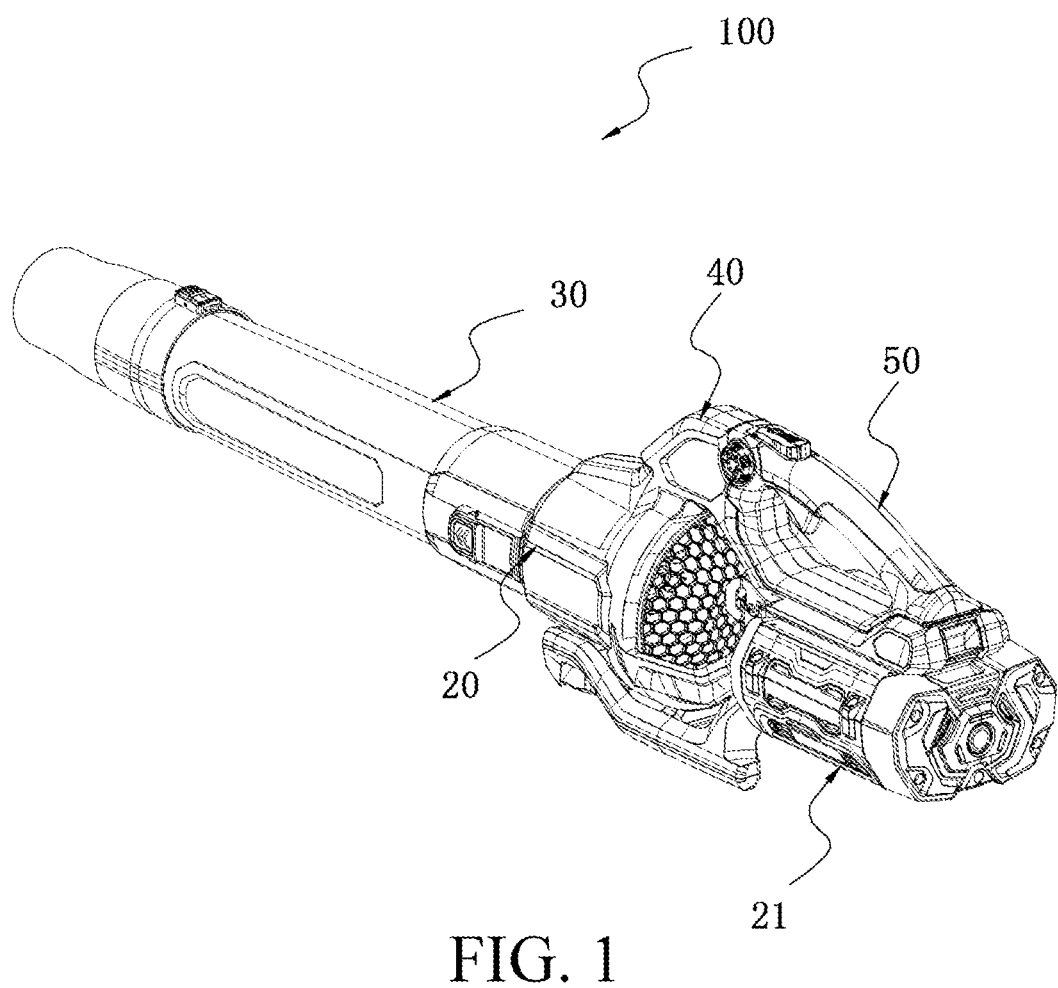
FIG. 1 is a schematic diagram of an example blower.
Figure 2:
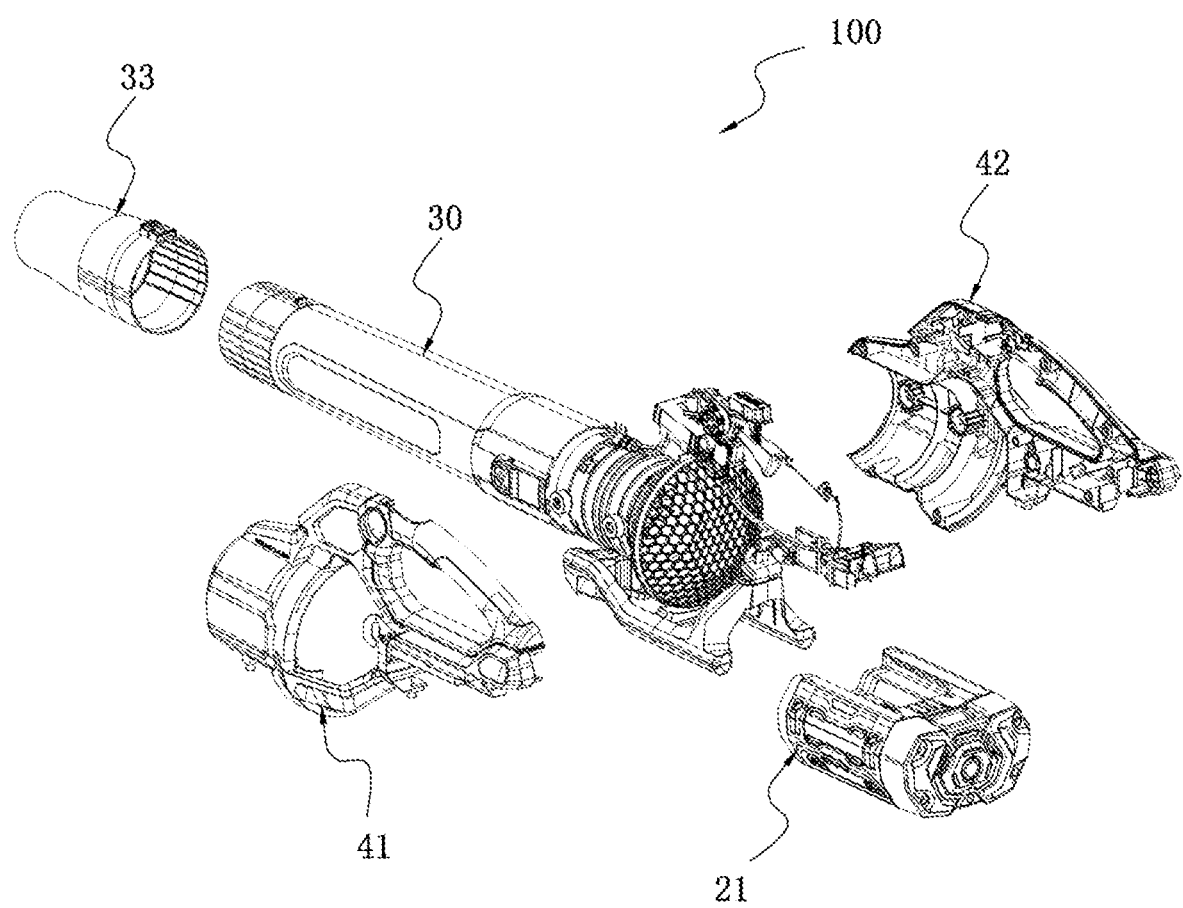
FIG. 2 is an exploded diagram of the blower in FIG. 1.
Figure 3:
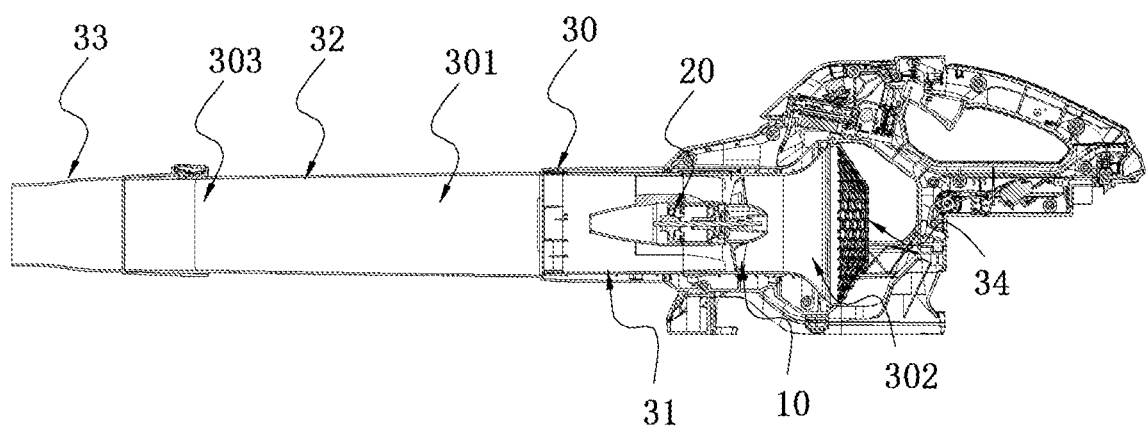
FIG. 3 is a sectional view of the blower in FIG. 1 after a battery pack is removed.
Figure 4:
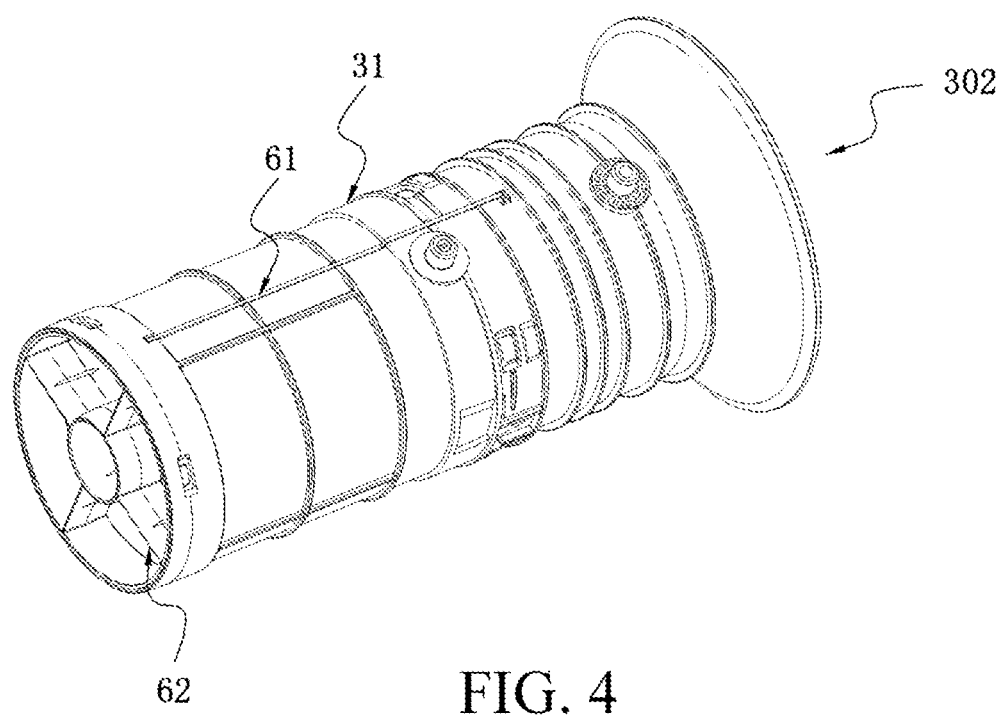
FIG. 4 is a three-dimensional diagram of a partial structure of the blower in FIG. 1.
Figure 5:
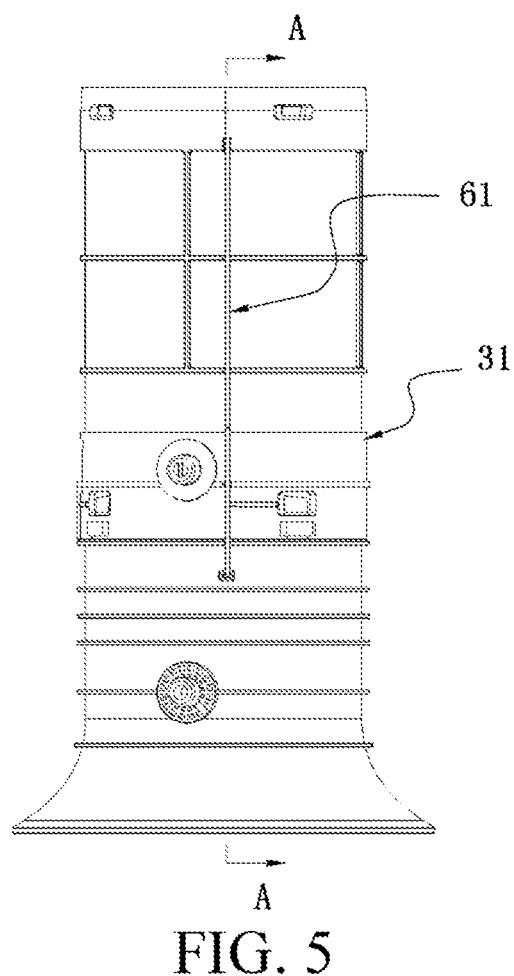
FIG. 5 is a planar diagram of the structure in FIG. 4.
Figure 6:
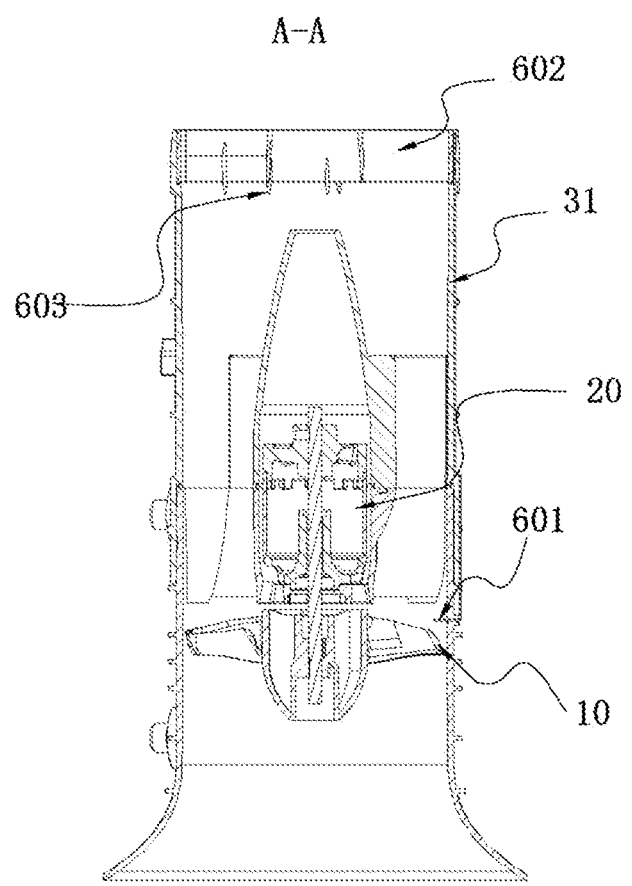
FIG. 6 is a sectional view of the structure in FIG. 4.

As shown in FIG. 1 to FIG. 3, an example blower 100 includes a fan 10, a motor 20, and an air duct assembly 30. The motor 20 drives the fan 10 to rotate. An air duct passage or channel 301 for guiding an airflow generated by the fan 10 is formed in the air duct assembly 30. The fan 10 is located inside the air duct passage 301. Two ends of the air duct passage 301 are defined with an air inlet 302 and an air outlet 303. The fan 10 rotates to drive the airflow to enter into the air duct passage 301 from the air inlet 302 and to be exhausted from or exported out of the air outlet 303. The air duct passage 301 may extend along a straight-line path. The air duct passage 301 may guide the airflow to flow forward along the straight-line path. The airflow flows forward or travels along a rotation axis of the fan 10.

The blower 100 includes a protection cover 34. The protection cover 34 is to prevent foreign objects or any other material from entering into the air duct passage 301 from the air inlet 302. Specifically, the protection cover 34 is of a porous structure. The airflow can enter into the air inlet 302 by passing through the protection cover 34. The protection cover 34 is fixed to the air duct assembly 30. The protection cover 34 is configured to cover the air inlet 302. The blower 100 includes a nozzle accessory 33. The nozzle accessory 33 is connected to the air duct assembly 30.

In a specific example, the air duct assembly 30 may include at least two air tubes. As shown in FIG. 2 to FIG. 6, the air duct assembly 30 includes a fixed inlet tube 31 and an air outlet tube 32. The air outlet tube 32 is connected to the fixed inlet tube 31. The air outlet tube 32 is detachably attached to the fixed inlet tube 31. An air outlet 303 is formed on the air outlet tube 32. An air inlet 302 is formed on the fixed inlet tube 31. The fan 10 is located within the fixed inlet tube 31. The electrical motor is also located within the fixed inlet tube 31. In an alternative embodiment, the air duct assembly 30 may consist of a complete tube.

In one example, the motor 20 is a motor powered by a power device with direct current or alternating current. The motor 20 is located within the air duct passage 301 of the air duct assembly 30. The fan 10 is an axial flow fan. The blower 100 further includes a PCB board and a heat sink for dissipating heat from the PCB board. The blower 100 includes a starting switch for starting the motor 20 and an operation trigger for controlling the starting switch. The operation trigger is for a user to operate so as to control the motor 20.

In another example, the motor 20 may be an internal combustion engine powered by fuel or any other driving device powered by electric source.

The blower 100 includes a housing 40. A handle 50 is formed onto the housing 40 for a user to hold. The blower 100 includes a battery pack 21 for powering the motor. The battery pack 21 is detachably attached to the housing 40. The air duct assembly 30 is connected to the housing 40. The housing 40 includes a first shell 41 and a second shell 42. In one example, the first shell 41 and the second shell 42 may clamp or sandwich the air duct assembly 30 from both sides.

In another example, the handle 50 may be directly formed by a part of the air duct assembly 30 or the handle 50 may be connected to the housing 40. The air duct passage 301 has a proximal end of the duct passage 301 and a distal end of the duct passage 301. In the direction of air movement, the proximal end of the duct passage 301 is close to the fan 10, and the distal end is far away from the fan 10. Along the air flowing or movement direction of the airflow, the air duct passage 301 also has an upstream side and a downstream side. The airflow flows from the upstream side toward the downstream side.

During rotation of the fan 10, continuous friction between the fan 20 and air will generate a great amount of electrostatic charges. When electrostatic charges are accumulated, the electrical motor or the circuit board may be greatly damaged by the accumulated electrostatic charges.

As shown in FIG. 1 to FIG. 7, the blower 100 further includes an electrostatic neutralization apparatus 60. The electrostatic neutralization apparatus 60 can neutralize electrostatic charges generated due to the rotation of the fan 10. The electrostatic neutralization apparatus 60 may also be referred to an electrostatic balance device or a potential compensation device.

Specifically, the electrostatic neutralization device 60 includes a first conductive end 601 and a second conductive end 602. The first conductive end 601 is electrically connected to the second conductive end 602, the first conductive end 601 is disposed within the air duct passage 301 and is close or adjacent to the fan 10, and the second conductive end 602 is disposed within the air duct passage 301, is located on the downstream side of the air duct passage 301, and is located, along the air flowing or movement direction of the airflow, much closer to the air outlet 303 than the first conductive end 601. It should be noted the first conductive end 601 or second conductive end 602 may be a conductor made of any conductive material such as metal, carbon fiber, etc., or an element with a layer or layers of conductive material disposed thereon.

In some examples, the first conductive end 601 is electrically connected to the second conductive end 602 by a connection portion connected between the first conductive end 601 and the second conductive end 602. The connection portion may be also made of a conductive material. In another example, the connection portion may be a metal conductor, or a conductor made of a carbon fiber material. In a further example, the connecting portion may have a main body with a layer or layers of conductive material thereon.

In an example, the connection portion is attached to a wall of the air duct assembly or the air duct passage 301. The first conductive end 601 penetrates through the wall of the air duct assembly or duct passage 301 to extend into the air duct passage 301, and is disposed close to the fan 10. The second conductive end 602 penetrates through the wall of the air duct assembly or duct passage 301 to extend into the air duct passage 301, and the second conductive end 602 is located, along the air flowing or movement direction of the airflow, much closer to the air outlet 303 than the first conductive end 601.

In another example, the connection portion is disposed within the air duct assembly or the air duct passage 301 or attached to a wall of the air duct assembly or duct passage 301, both of the first conductive end 601 and the second conductive end are located within the air duct passage 301, the first conductive end 601 is located close to the fan 10, and the second conductive end 602 is located, along the movement direction of the airflow, much closer to the air outlet 303 than the first conductive end 601.

The first conductive end 601 may be located within the air duct passage 301 in a suspended manner and close to the fan 10, and the second conductive end 602 may be located within the air duct passage 301 in a suspended manner and is much closer, along the air flowing direction of the airflow, to the air outlet 303 than the first conductive end 601.

When the fan 10 rotates, the high-speed motion collisions of air within the air duct passage 301 generates electrostatic charges, and the high-speed motion collisions between blades of the fan 10 and air within the air duct passage 301 also generate a great amount of electrostatic charges. Because of the first conductive end 601 disposed close to the fan 10, the first conductive end 601 can collect electrostatic charges or electrostatic ions generated around the blades of the fan 10. In addition, the high-speed motion collisions of the first conductive end 601 and the air also generate electrostatic charges. Electrostatic charges or electrostatic ions that are generated around the blades of the fan 10 and/or generated by the high-speed motion collisions between the first conductive end 601 and the air are firstly collected by the first conductive end 601, are then transferred to the second conductive end 602 via the connection portion or an electrical connection between the first conductive end 601 and the second conductive end 602. The second conductive end 602 is located in a suspended manner within the air duct passage 301 and is set to be in contact with air. In this way, the electrostatic charges, which may include positive electrical charges and/or negative electrical charges, generated at or around the blades of the fan 10 and/or generated by the high-speed motion collisions between the first conductive end 601 and the air will be collected by the first conductive end 601 and then transferred to the second conductive end 602, and the charges of the air around the second conductive end 602 is to neutralize with the electrostatic charges released by the second conductive end 602. Thus, electrostatic charges or electrostatic ions accumulated around the fan 10, which is adjacent to the motor, during the operation of the blower 100 will be greatly reduced or eliminated.

The second conductive end 602 is located, along the air flowing or movement direction at a downstream side of the first conductive end 601. In some examples, along the air flowing direction of the airflow, the second conductive end 602 may be located close to the air outlet 303, or the second conductive end 602 may be located between the first conductive end 601 and the air outlet 303.

Further, one or more tips may be formed on the first conductive end 601, and the tips are free and exposed to the air duct passage 301. More specifically, the first conductive end 601 is provided with one or more tips configured to protrude toward a direction opposite to the air flowing direction of the airflow. The first conductive end 601 protrudes out of the air channel wall. More specifically, the first conductive end 601 is set to extend from the wall of the air duct assembly toward the fan 10. The one or more tips formed on the first conductive end 601 has an effect of collecting electrostatic charges or electrostatic ions generated at or around the blades of the fan 10 and/or generated by the high-speed motion collisions between the first conductive end 601 and the air, thereby alleviating or improving electrostatic leakage.

The first conductive end 601 is disposed within the air duct passage 301 and close to the fan 10. The first conductive end 601 can collect electrostatic charges or electrostatic ions generated at or around the one or more tips of the blades of the fan 10 or the motor, so that the first conductive end 601, which is used for collecting electrostatic charges or electrostatic ions, can be directly disposed within the air duct assembly and has no need to be mounted onto the motor 20 or the fan 10. Therefore, the assembling and placement of the electrostatic neutralization apparatus 60 or the first conductive end 601 can be a simple work, thereby avoiding a problem that occurs due to the improper assembling and placements of the motor 20 or the fan 10 during the mass production of the blower.

The second conductive end 602 is exposed to the air duct passage 301. The second conductive end 602 may be formed with one or more tips that are exposed to the air duct passage 301. The one or more tips of the second conductive end 602 has electrostatic discharge effect, and configured to enable the static charges or electrostatic ions transferred to the second conductive end 602 to be released into the air around the second conductive end 602. That is, the one or more tips of the second conductive end 602 are used for discharging electrostatic charges or electrostatic ions transferred to the second conductive end 602 and further releasing the transferred electrostatic charges or electrostatic ions into the air around the second conductive end 602 so as to be neutralized with the electrostatic charges or electrostatic ions of the air around the second conductive end 602 within the air duct passage 301.

A distance between the first conductive end 601 and the fan 10 is arranged such that during the rotation of the fan 10, the first conductive end 601 can collect as much electrostatic charges or ions as possible at or around the blades of the fan 10 so as to reduce electrical leakage therein. In an example, the distance between the first conductive end 601 and the fan 10 may be less than or equal to 15 mm.

In one example, the distance between the first conductive end 601 and the fan 10 may be greater than 1 mm and less than or equal to 15 mm. In a second example, the distance between the first conductive end 601 and the fan 10 may be greater than 1 mm and less than or equal to 10 mm. In a third example, the distance between the first conductive end 601 and the fan 10 may be greater than 1 mm and less than or equal to 5 mm. In a fourth example, the distance between the first conductive end 601 and the fan 10 may be greater than 1 mm and less than or equal to 3 mm. In a fifth example, the distance between the first conductive end 601 and the fan 10 may be greater than 3 mm and less than or equal to 10 mm. In a sixth example, the distance between the first conductive end 601 and the fan 10 is greater than 3 mm and less than or equal to 5 mm. It should be noted the distance between the first conductive end 601 and the fan 10 was selected in these examples based on the operational requirement of the blower.

The first conductive end 601 is configured to penetrate through the wall or walls of the air duct assembly so as to extend into the air duct passage 301. The second conductive end 602 is also configured to penetrate through the wall or walls of the air duct passage 301.

In an example, the electrostatic neutralization apparatus 60 includes a conductor 61. The conductor 61 is attached or fixed to the air duct assembly 30. In some examples, the conductor 61 may be in the form of a strip. In some examples, the conductor 61 may be made of a metal material. In one example, a free end of the conductor 61 may penetrate through a wall or walls of the air duct assembly to extend into the air duct passage 301. The free end that extends into the air duct passage 301 may be the first conductive end 601.

In the above-described examples, the first conductive end 601 is disposed adjacent or close to the fan 10 within the air duct passage 301, and compared with the prior art that electrostatic charges or ions are transferred to the motor shaft by the fan blades to collect electrostatic charges or ions, the first conductive end 601 has a better effect of collecting electrostatic charges or electrostatic ions because of the conventional fan blades being made of plastics material, and the transferring effect of the plastics blades is worse than that of the conductor or the conductive end 601. In alternative examples, the electrostatic neutralization apparatus 60 may include a conductor extending from a first location adjacent to the fan or between the fan and the motor toward a second location which is spaced at a distance from the first location. The distance between the first location and the second location may be varied in different blowers and determined by actual operation requirements of the different blowers.

Figure 7:
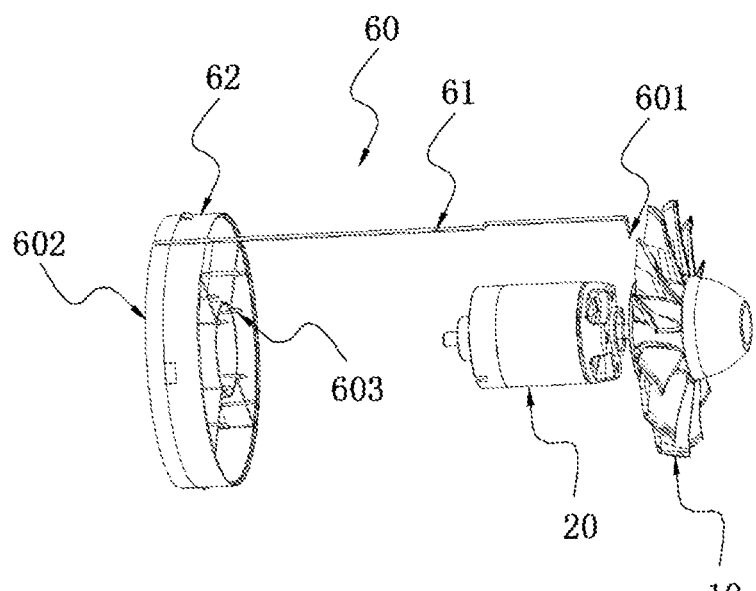
FIG. 7 is a schematic diagram of an example electrostatic neutralization apparatus, a fan, and a motor of the blower in FIG. 1.

As shown in FIG. 7, the electrostatic neutralization apparatus 60 may include a first part 62. The first part 62 can act as the second conductive end 602. A plurality of tips 603 may be formed on the first part 62.

The first part 62 can be configured to prevent a foreign material or object of relatively large size from extending into the air duct passage 301 from a side of the air inlet 302 so as to avoid damage to the fan 10. The first part 62 has one or more tips 603 to extend from the first part 62 toward the fan 10 or to protrude from the first part 62 toward an upstream side of the airflow. The conductor 61 may be connected to the first part 62 and set to be in contact with the first part 62.

In an example, the first part 62 may have a layer or layers of conductive paint or material coated or disposed on its outer surface. Thus, the first part 62 is electrically connected to the conductor 61 by the outer surface of the first part 62. Due to the outer surface of the first part 62 being conductive, the first part can be made of non-conductive material. In one example, the first part 62 may be a plastic part or member.

Figure 8:
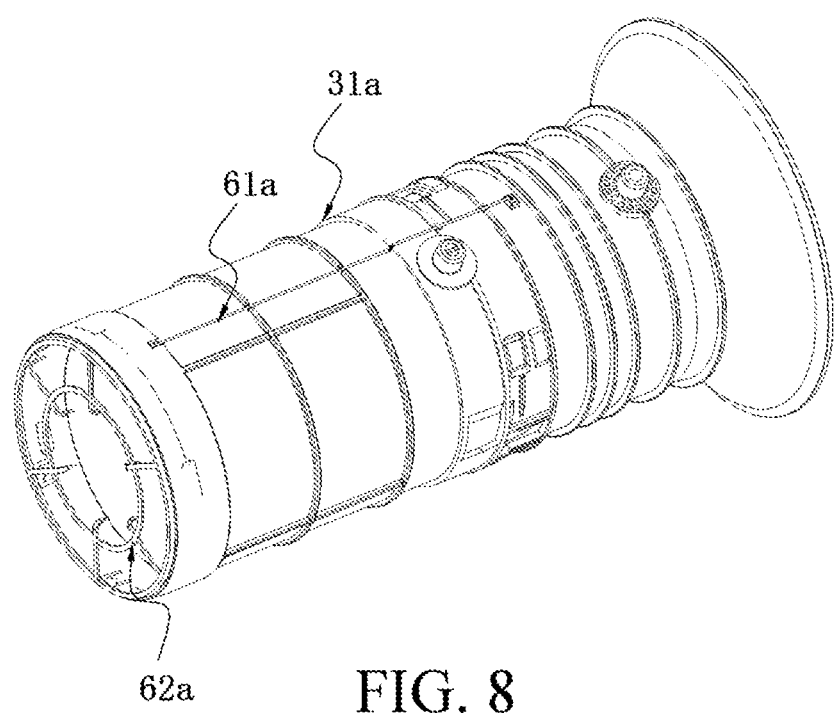
FIG. 8 is a schematic diagram of another example electrostatic neutralization apparatus and a fixed air channel tube.
Figure 9:
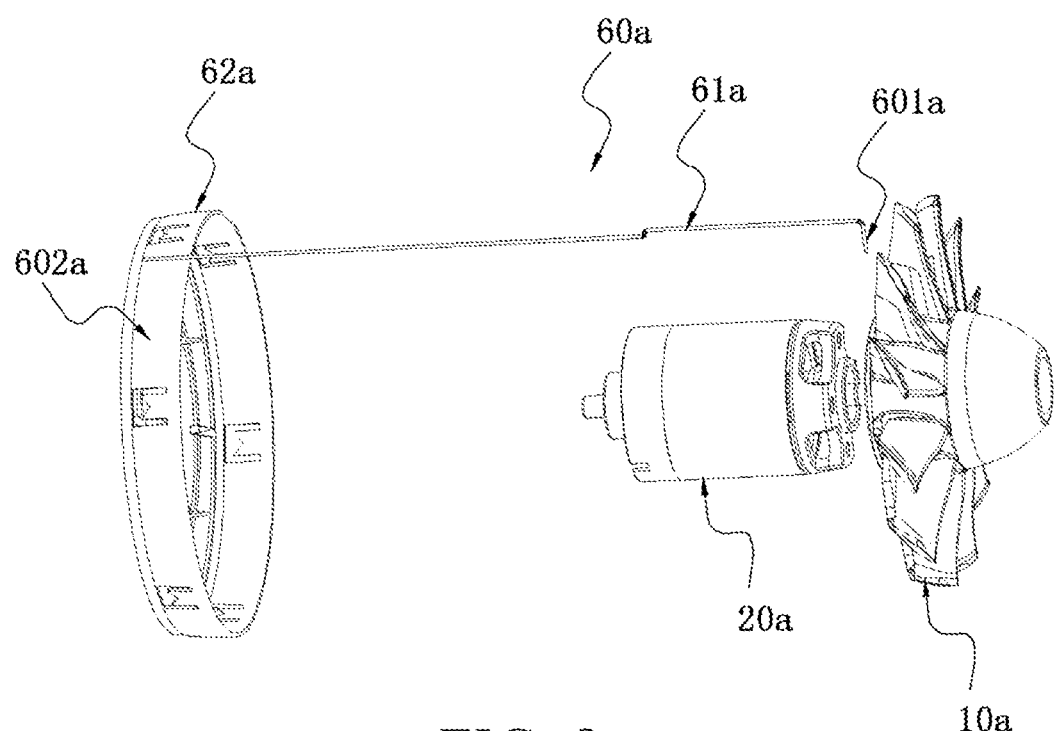
FIG. 9 is a schematic diagram of the electrostatic neutralization apparatus in FIG. 8, a fan, and a motor.
Figure 10:
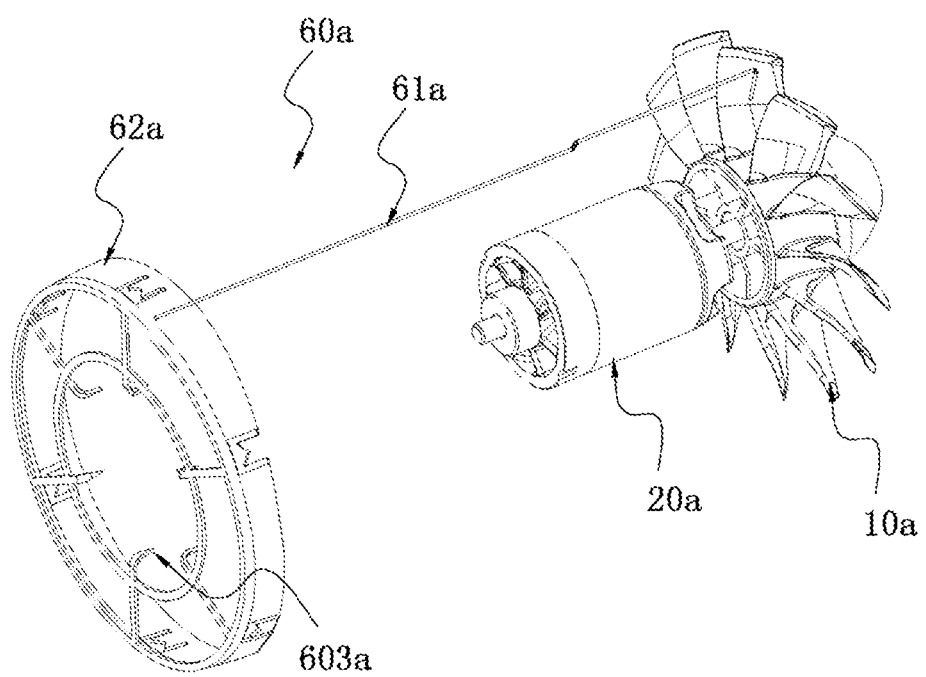
FIG. 10 is a schematic diagram of the electrostatic neutralization apparatus in FIG. 8, a fan, and a motor in another visual angle.

In another example, the first part may be made of a conductive material. Specifically, the first part may be made of a metal material. As shown in FIG. 8 to FIG. 10, in an example, an electrostatic neutralization apparatus 60a includes a conductor 61a and a first part 62a attached to the conductor 61a. The first part 62a is fixed to a fixed air channel member 31a. The first part 62a is located at an end of the fixed air channel member 31a. The conductor 61a is in a form of a conducting wire. An end of the conducting wire is configured to extend into the air duct passage 301 to act as a first conductive end 601a. In FIG. 7, the first part 62 may act as a second conductive end 602a.

The first part 62a may be made of a conductive material. Specifically, the first part 62 is made of a metal material. A plurality of tips 603a is formed on the first part 62a. The first part 62a is at least partly located within the air duct passage 301 of the air duct assembly.

In one example, the conductor may have a conductive coating thereon. A conductive coating may also cover an outer surface of the air duct assembly.

In another example, the conductor may include a plurality of first conductive ends.

In further examples, the electrostatic neutralization apparatus may include a conductor with two respective ends of the conductor extending into the air duct passage. The two ends of the conductor respectively serve as a first conductive end and a second conductive end. Further, the conductor may be in form of a conducting wire or any other conductive structure. The electrostatic neutralization apparatus may be made of one or more parts, which are assembled to be a whole one. One or more tips may be formed on the second conductive end.

In another example, the electrostatic neutralization apparatus may include a conductor and a first part attached to the conductor. An end of the conductor is configured to extend into the air duct passage to act as a first conductive end. The first part is attached or connected to the conductor to act as a second conductive end. A plurality of tips is formed on the first part within the air duct passage. The one or more tips are set to be in contact with the charged air within the air duct passage so as to neutralize static electricity therein.

In another example, the electrostatic neutralization apparatus may include a conductor and a plurality of first parts attached to the conductor. The first parts may serve as a second conductive end. Each of the first parts may form one or more tips.

The foregoing shows and describes basic principles and main features and advantages of example blowers. It should be understood by a person skilled in the art that the foregoing examples are not intended to limit the claimed invention to any particular form but that all technical solutions obtained in an equivalent replacement or equivalent transformation manner are meant to fall within the protection scope of the appended claims.

What is claimed is:

1. A blower, comprising:
   a fan;
   a motor for driving the fan to rotate;
   an air duct assembly having an air duct passage with an air inlet and an air outlet, wherein the fan is located within the air duct passage of the air duct assembly and close to the air inlet and the fan rotates to drive an airflow to enter, along an airflow direction, into the air duct passage from the air inlet and to be exported out of the air outlet; and
   an electrostatic neutralization apparatus, mounted onto the blower, wherein the electrostatic neutralization apparatus comprises a first conductive end, a second conductive end, and a connection portion connected between the first conductive end and the second conductive end, wherein the connection portion is attached to a wall of the air duct assembly, the first conductive end is configured to penetrate through the wall of the air duct assembly so as to extend into the air duct passage, the first conductive end is located close to the fan, the second conductive end is configured to penetrate through the wall of the air duct assembly so as to extend into the air duct passage, and the second conductive end is located, along the airflow direction, much closer to the air outlet than the first conductive end.

2. The blower according to claim 1, wherein the first conductive end is formed with one or more tips exposed to the air duct passage of the air duct assembly.

3. The blower according to claim 1, wherein the first conductive end is configured to extend from the wall of the air duct assembly toward the fan.

4. The blower according to claim 1, wherein a distance between the first conductive end and the fan is less than or equal to 15 mm.

5. The blower according to claim 1, wherein the second conductive end is formed with one or more tips located within the air duct passage of the air duct assembly.

6. The blower according to claim 1, wherein the electrostatic neutralization apparatus comprises a conductor, the conductor is fixed to the air duct assembly and has the first conductive end that extends into the air duct passage of the air duct assembly.

7. The blower according to claim 1, wherein the electrostatic neutralization apparatus comprises a conductive wire, the conductive wire has the first conductive end that extends from the wall of the air duct assembly into the air duct passage of the air duct assembly.

8. A blower, comprising:
   a fan;
   a motor for driving the fan to rotate;
   an air duct assembly having an air duct passage with an air inlet and an air outlet, wherein the fan is located within the air duct passage of the air duct assembly and close to the air inlet and the fan rotates to drive an airflow to enter, along an airflow direction, into the air duct passage from the air inlet and to be exposed out of the air outlet; and
   an electrostatic neutralization apparatus attached to the blower, wherein the electrostatic neutralization apparatus comprises a conductor, the conductor has a first conductive end and a second conductive end arranged such that the first conductive end is disposed within the air duct passage of the air duct assembly and close to the fan, the second conductive end is disposed within the air duct passage of the air duct assembly, and the second conductive end is located much closer to the air outlet than the first conductive end, wherein the first conductive end is free and located in a suspended manner within the air duct passage of the air duct assembly.

9. The blower according to claim 8, wherein a distance between the first conductive end and the fan is less than or equal to 15 mm.

10. The blower according to claim 8, wherein the second conductive end is free and located in a suspended manner within the air duct passage of the air duct assembly.

11. The blower according to claim 8, wherein the second conductive end is formed with one or more tips exposed to the air duct passage of the air duct assembly.

12. The blower according to claim 8, wherein the first conductive end is formed with one or more tips exposed to the air duct passage of the air duct assembly.

13. The blower according to claim 8, wherein the first conductive end is configured to extend from a wall of the air duct assembly toward the fan.

* * * * *